(12) United States Patent
Siegel, Jr.

(10) Patent No.: US 11,279,326 B1
(45) Date of Patent: Mar. 22, 2022

(54) DEBRIS REMOVAL DEVICE

(71) Applicant: Donald J. Siegel, Jr., Minooka, IL (US)

(72) Inventor: Donald J. Siegel, Jr., Minooka, IL (US)

(73) Assignee: Donald J. Siegel, Jr., Minooka, IL (US)

( * ) Notice: Subject to any disclaimer, the term of this patent is extended or adjusted under 35 U.S.C. 154(b) by 0 days.

(21) Appl. No.: 17/314,842

(22) Filed: May 7, 2021

(51) Int. Cl.
 *B60S 1/68* (2006.01)
(52) U.S. Cl.
 CPC ........................ *B60S 1/68* (2013.01)
(58) Field of Classification Search
 CPC ......................................................... B60S 1/68
 See application file for complete search history.

(56) References Cited

U.S. PATENT DOCUMENTS

| | | | | |
|---|---|---|---|---|
| 185,660 | A | * | 12/1876 | Bacon ....................... B60S 1/68 280/855 |
| 913,576 | A | * | 2/1909 | Stark ......................... B60S 1/68 280/855 |
| 940,859 | A | * | 11/1909 | Davison .................... B60S 1/68 280/855 |
| 1,108,833 | A | * | 8/1914 | Crues ........................ B60S 1/68 280/855 |
| 1,602,492 | A | | 10/1926 | James et al. |
| 1,753,992 | A | | 4/1930 | Larson et al. |
| 1,828,824 | A | | 10/1931 | Von Brethorst |
| 1,837,946 | A | | 12/1931 | Bosch |
| 1,917,673 | A | | 7/1933 | Thiemann |
| 1,932,054 | A | | 10/1933 | Von Brethorst |
| 1,933,679 | A | * | 11/1933 | Nicewander .............. B60S 1/68 280/855 |
| 2,077,919 | A | | 4/1937 | Engstrom |

(Continued)

FOREIGN PATENT DOCUMENTS

| | | | |
|---|---|---|---|
| CA | 2994884 A1 | * 8/2019 | ................ B60S 1/68 |
| CN | 104386031 A | * 3/2015 | |

(Continued)

OTHER PUBLICATIONS

Sloan Express, Combine wheel mud scraper kit for John Deere, 2021 (Year: 2021).*

(Continued)

*Primary Examiner* — Jacob B Meyer
(74) *Attorney, Agent, or Firm* — Marshall, Gerstein & Borun LLP

(57) ABSTRACT

A scraper for removing debris from between first and second tires of a vehicle is provided. The scraper may include a tower, a bracing arm, and a scraper. The tower may have a first end, a second end, and a longitudinal axis extending between the first and second ends, the first end couples to a first portion of the vehicle. The bracing arm may have a first end coupled to the tower and a second end coupled to a second portion of the vehicle that is different from the first portion of the vehicle. The paddle may be suspended by the tower and extends at least partially between the first and second tires of the vehicle. An angle between the bracing arm and the tower may be in a range of approximately 10 degrees to approximately 90 degrees relative to the longitudinal axis of the tower.

20 Claims, 12 Drawing Sheets

(56) References Cited

U.S. PATENT DOCUMENTS

| | | | | |
|---|---|---|---|---|
| 2,157,253 | A | 5/1939 | Yetter | |
| 2,356,292 | A | 8/1944 | Wildman | |
| 2,454,002 | A * | 11/1948 | Paluck | B60S 1/68 280/855 |
| 2,509,807 | A | 5/1950 | Carlton | |
| 2,522,204 | A * | 9/1950 | Adolphson | B60S 1/68 280/855 |
| 2,770,469 | A * | 11/1956 | Seda | A01B 71/08 280/855 |
| 2,799,515 | A * | 7/1957 | Lobozzo | B60S 1/68 280/855 |
| 2,823,928 | A | 2/1958 | Dahlstrom | |
| 2,839,313 | A * | 6/1958 | Walko | B60S 1/68 280/856 |
| 3,085,484 | A | 4/1963 | McAdams et al. | |
| 3,259,036 | A | 7/1966 | Peterson | |
| 3,464,714 | A | 9/1969 | Prillinger | |
| 3,788,668 | A * | 1/1974 | Perger | B62D 25/188 280/851 |
| 3,800,880 | A | 4/1974 | Schafbuch | |
| 3,913,943 | A | 10/1975 | Tamburino et al. | |
| 4,206,825 | A | 6/1980 | Van der Lely | |
| 4,334,694 | A | 6/1982 | Iwanicki | |
| 4,368,797 | A * | 1/1983 | van der Lely | B60S 1/68 180/235 |
| 4,487,286 | A * | 12/1984 | van der Lely | B60S 1/68 172/435 |
| 4,818,040 | A | 4/1989 | Mezzancella et al. | |
| 4,830,439 | A | 5/1989 | Collins et al. | |
| 5,188,394 | A * | 2/1993 | Roche | B60S 1/68 172/606 |
| 5,226,703 | A | 7/1993 | Norman | |
| 5,297,497 | A * | 3/1994 | Schmidt | B60S 1/68 111/135 |
| 5,360,288 | A | 11/1994 | O'Neill et al. | |
| 5,431,233 | A | 7/1995 | Schmidt | |
| 5,611,157 | A | 3/1997 | Ferreira | |
| 5,762,408 | A | 6/1998 | Marsh | |
| 5,857,238 | A * | 1/1999 | Jmill | B60S 1/68 15/256.5 |
| 6,527,347 | B2 | 3/2003 | Brawley et al. | |
| 7,131,670 | B2 * | 11/2006 | Kinoshita | B60B 11/00 280/856 |
| 7,591,515 | B2 | 9/2009 | Breton et al. | |
| 8,051,916 | B2 | 11/2011 | Bright et al. | |
| 8,061,466 | B2 | 11/2011 | Carlton et al. | |
| 8,690,193 | B2 * | 4/2014 | Yamamoto | B60P 1/283 280/856 |
| 9,067,570 | B2 * | 6/2015 | Kueppers | B60S 1/68 |
| 9,120,466 | B2 * | 9/2015 | Lindemeier | B60S 1/68 |
| 9,346,438 | B1 * | 5/2016 | Parker, III | B08B 1/002 |
| 9,434,358 | B2 | 9/2016 | Montgomery | |
| 10,654,533 | B2 | 5/2020 | Gustafson et al. | |
| 2002/0167222 | A1 | 11/2002 | Grob et al. | |
| 2014/0284911 | A1 * | 9/2014 | Kueppers | B60S 1/68 280/855 |

FOREIGN PATENT DOCUMENTS

| | | | | |
|---|---|---|---|---|
| DE | 202016103212 U1 * | 8/2016 | | B60S 1/68 |
| EP | 0337981 A2 * | 10/1989 | | B60S 1/68 |

OTHER PUBLICATIONS

Lankota, Mud scraper kit for any John Deere STS Combine, Sep. 9, 2019 (Year: 2019).*

Seed Hawk, Devloo Mud scraper upgrade instructions, Apr. 10, 2019 (Year: 2019).*

\* cited by examiner

DEBRIS REMOVAL DEVICE

FIELD OF THE DISCLOSURE

The present disclosure relates to a debris removal device and, more particular, to a debris removal device that removes debris build-up against a tire of a vehicle.

BACKGROUND

Multi-terrain vehicles such as tractors, bulldozers, and heavy machinery drive over different kinds of terrain while accomplishing various tasks. As a multi-terrain vehicle drives over various kinds of terrain, objects and debris may become lodged or otherwise stuck in different components or parts of the multi-terrain vehicle. If the lodged or stuck objects and debris continue accumulating, for example between tires in a dual-tire configuration, without being removed or cleaned, it is possible that the objects and debris damage or inhibit the performance of the multi-terrain vehicle. In fact, the large build-up of debris on the multi-terrain vehicle may have negative implications on the drivability of the multi-terrain vehicle and the usability of various components or features of the multi-terrain vehicle. For example, continued build-up of debris between the tires may increase the weight of the dual-tires, and ultimately the vehicle, thereby causing the vehicle to sink deeper than optimal into the unpaved terrain; wear down the inner wall of one or each of the tires in the dual-tire configuration resulting in a costly repair; or eventually build-up on the treads of one or each of the tires thereby reducing the additional traction provided by the dual-tire configuration. As such, the collection of objects and debris may damage or otherwise render inoperable certain components of the multi-terrain vehicle resulting in costly repairs and downtime.

Vehicles that drive over unpaved terrain (e.g., muddy fields, dirt roads) may have attachments or configurations that make driving over the unpaved terrain easier. For example, a dual-tire configuration may provide the vehicle with additional traction, which makes driving across the unpaved terrain easier. However, as the vehicle drives across the unpaved terrain, debris may become lodged in the gap, or space, between the tires in the dual-tire configuration. The disadvantageous effects of debris building-up in the gap between the tires in the dual-tire configuration may be avoided by frequently cleaning, or otherwise removing, the debris in the gap between the tires (e.g., after each use of the vehicle, after every other use). However, frequently cleaning the gap between the tires is time consuming and slows productivity.

SUMMARY

In accordance with a first exemplary aspect of the present disclosure, a vehicle may include a body that may have a front end, a rear end opposite the front end, and a longitudinal axis extending between the front and rear ends. An axle may be coupled to the body and perpendicular relative to the longitudinal axis. The vehicle may include a first tire, a second tire, and a gap between the first and second tires. The first and second tires may be coupled to the axle at a side of the vehicle. A scraper may be coupled to the axle and configured to remove debris from between the first and second tires. The scraper may include a tower having a first end coupled to the axle and a second end disposed at a height greater than a height of the first and second tires. An extension arm may be coupled to the tower and extending outward relative to the longitudinal axis of the body. A paddle may be coupled to the extension arm and may include a first end at least partially disposed in the gap between the first and second tires and a second end coupled to the extension arm.

In accordance with a second exemplary aspect of the present disclosure, a scraper for removing debris from a vehicle may include a tower having a first end, a second end opposite the first end, and a longitudinal axis extending between the first and second ends. The first end configured to couple to a first portion of the vehicle. A bracing arm may have a first end, a second end, and a longitudinal axis extending between the first and second ends. The first end may be coupled to the tower and the second end may be configured to couple to a second portion of the vehicle that is different from the first portion of the vehicle. A paddle may be suspended by the tower and configured to extend to a location adjacent to a tire of the vehicle. An angle between the longitudinal axis of the bracing arm and the longitudinal axis of the tower may be in a range of approximately 10 degrees to approximately 90 degrees.

In accordance with the first or second exemplary aspects, the vehicle or scraper may further include any one or more of the following preferred forms.

In a preferred form, the tower may extend away from the axle and toward a rear of the vehicle.

In a preferred form, a bracing arm may have a first end coupled to the tower and a second end coupled to the body.

In a preferred form, the bracing arm may be arranged to limit rotation of the tower relative to the axle.

In a preferred form, the bracing arm may be coupled to the tower between the first end of the tower and the extension arm.

In a preferred form, a support arm may be coupled to the tower between the first end of the tower and the bracing arm.

In a preferred form, the extension arm may include an end disposed below the height of the first and second tires.

In a preferred form, the first end of the paddle may include a blade sized to fit within the gap.

In a preferred form, the paddle may be adjustably connected to the end of the extension arm.

In a preferred form, a distance between the paddle and the tower may be adjustable.

In a preferred form, a tower coupling mechanism may have a first plate and a second plate attached to opposite sides of the axle.

In a preferred form, an angle between the longitudinal axis of the tower and the first plate of the tower coupling mechanism may be in a range of approximately 10 degrees and approximately 90 degrees.

In a preferred form, the bracing arm may be coupled to the tower between the second end of the tower and a midpoint of the tower to counteract a torque exerted on the tower by the paddle.

In a preferred form, the paddle may include a blade disposed at a first end.

In a preferred form, a paddle coupling mechanism may be disposed at a second end of the paddle.

In a preferred form, the paddle coupling mechanism may adjustably couple the paddle to the extension arm.

In a preferred form, the first end of the bracing arm may be disposed between the first and second ends of the tower.

In a preferred form, an extension arm may be coupled to the second end of the tower.

In a preferred form, the paddle may be coupled to an end of the extension arm.

In a preferred form, an angle between the paddle and the extension arm may be in a range between approximately 90 degrees and approximately 130 degrees.

In a preferred form, a support arm may be coupled to the tower at a location between the first end of the bracing arm and the second end of the tower.

In a preferred form, the support arm may be arranged to couple to a different portion of the vehicle.

In a preferred form, the support arm may be perpendicular relative to the longitudinal axis of the tower.

In a preferred form, the bracing arm may include a bracing coupling plate extending perpendicular relative to the longitudinal axis of the tower.

DETAILED DESCRIPTION

Figure 1:
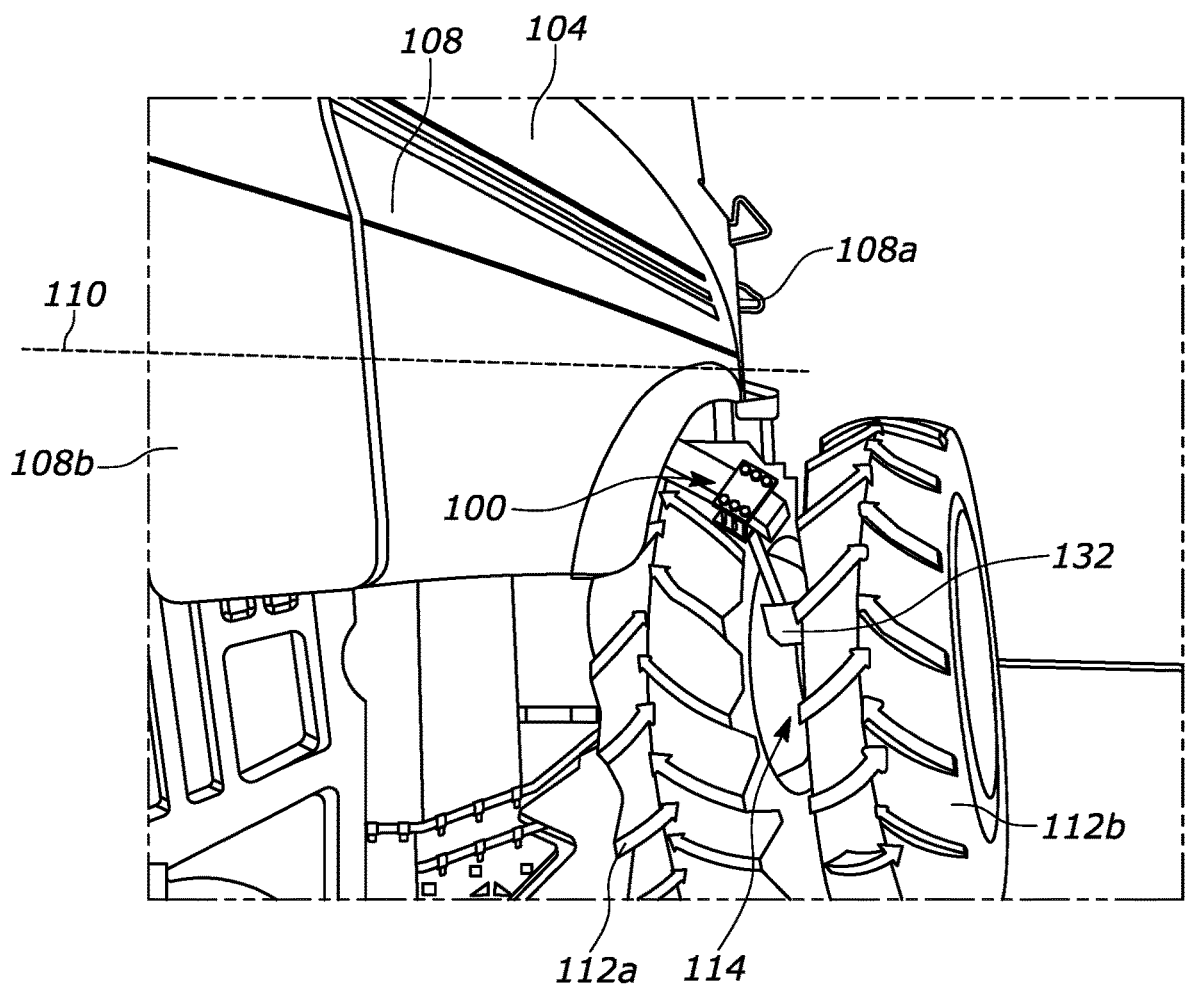
FIG. 1 is a back, perspective view of a first exemplary scraper constructed in accordance with the teachings of the present disclosure, showing the scraper attached to a vehicle.

A scraper as disclosed herein advantageously removes debris lodged between two tires in a dual-tire configuration while the vehicle is being driven minimize debris from building up between the tires of the dual-tire configuration. FIG. 1 illustrates an example scraper 100 that is constructed in accordance with the teachings of the present disclosure. The scraper 100 attaches to a vehicle 104 at three connection points and extends between the tires of the vehicle 104 from a point that is higher than a height of the tires of the vehicle 104. The vehicle 104 can be, for example, a combine, a harvester, tractor, truck, or any other multi-terrain or heavy equipment vehicle that is capable of and/or regularly drives over unpaved terrain. In either such example, the vehicle 104 includes, at least, a body 108, a first tire 112a, a second tire 112b, and an axle 116 (FIG. 3) that operably couples the first and second tires 112a, 112b to the body 108 of the vehicle 104. The body 108 includes, at least, a front end 108a, a rear end 108b that is opposite of the front end 108a, and a longitudinal axis 110 extending between the front and rear ends 108a, 108b. The axle 116 is coupled to the body 108 and is perpendicular relative to the longitudinal axis 110. The first tire 112a and the second tire 112b are coupled to one another in a dual-tire configuration where the first and second tires 112a, 112b are disposed on the same side of the axle 116 and the first tire 112a is spaced away from the second tire 112b by a gap 114. The gap 114 spaces the first and second tires 112a, 112b from each other, thereby preventing the tires 112a, 112 from rubbing against one another.

Figure 3:
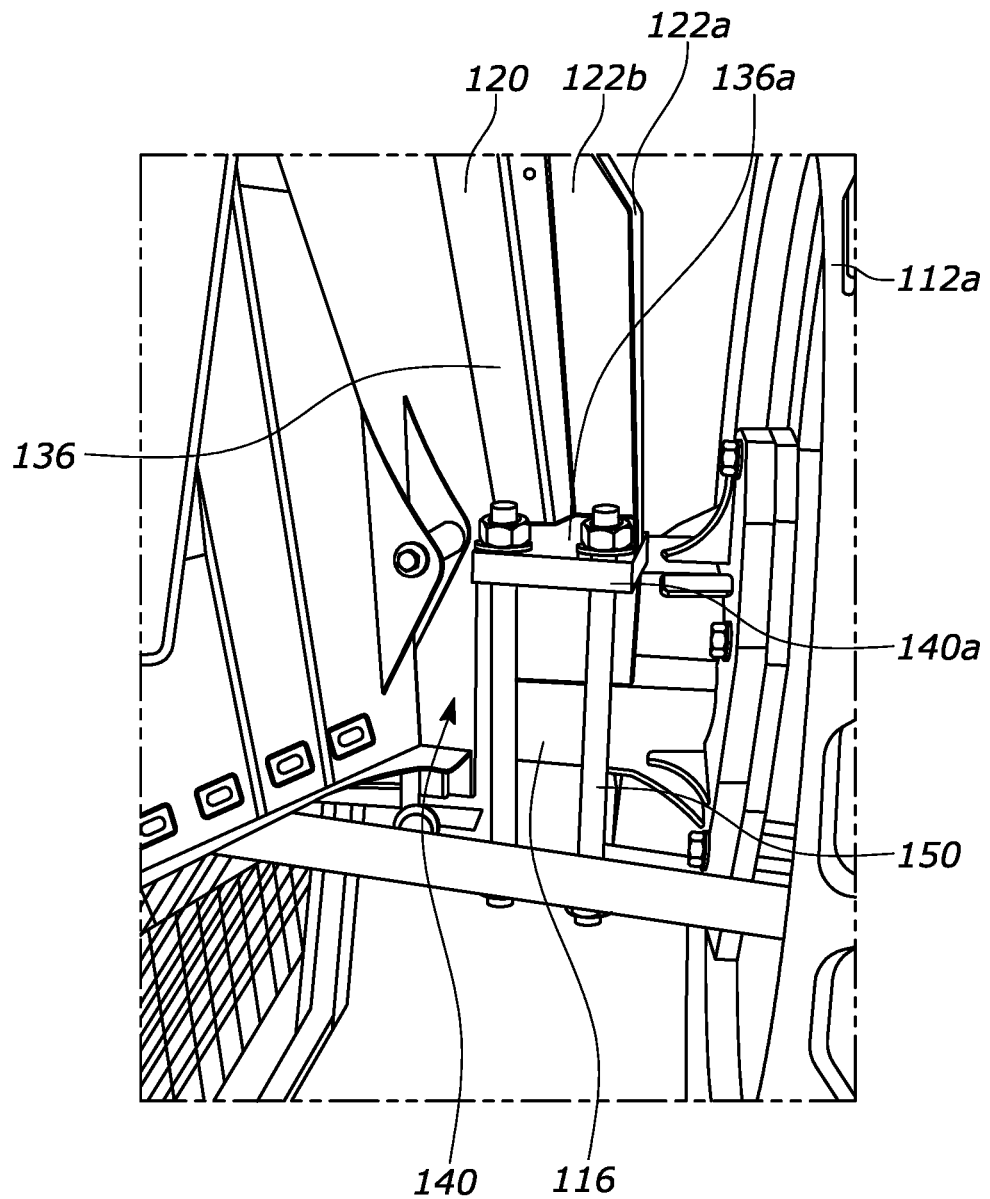
FIG. 3 is a different back, perspective view of the scraper attached to the vehicle of FIG. 1.
Figure 4:
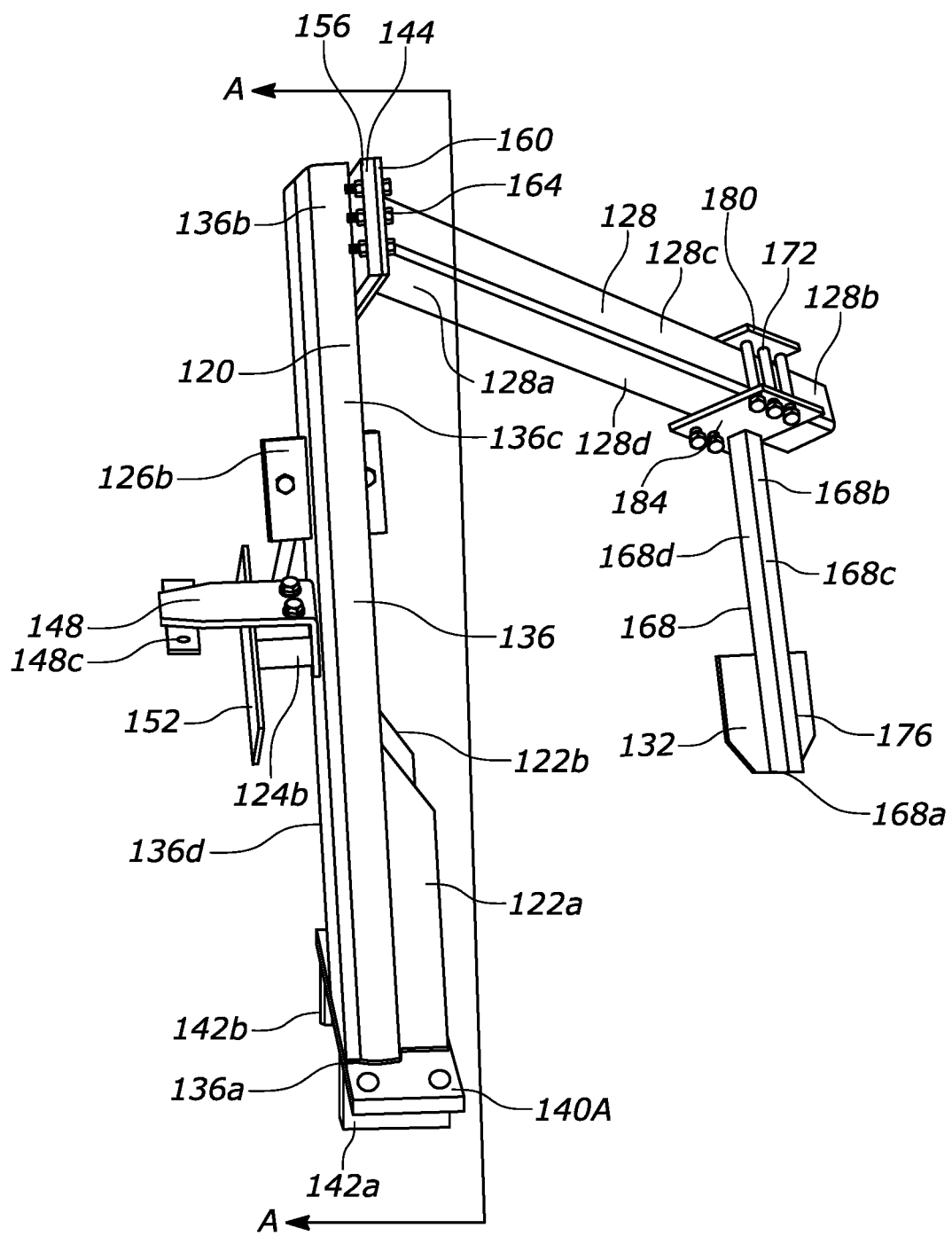
FIG. 4 is a front perspective view of a second exemplary scraper.
Figure 5:
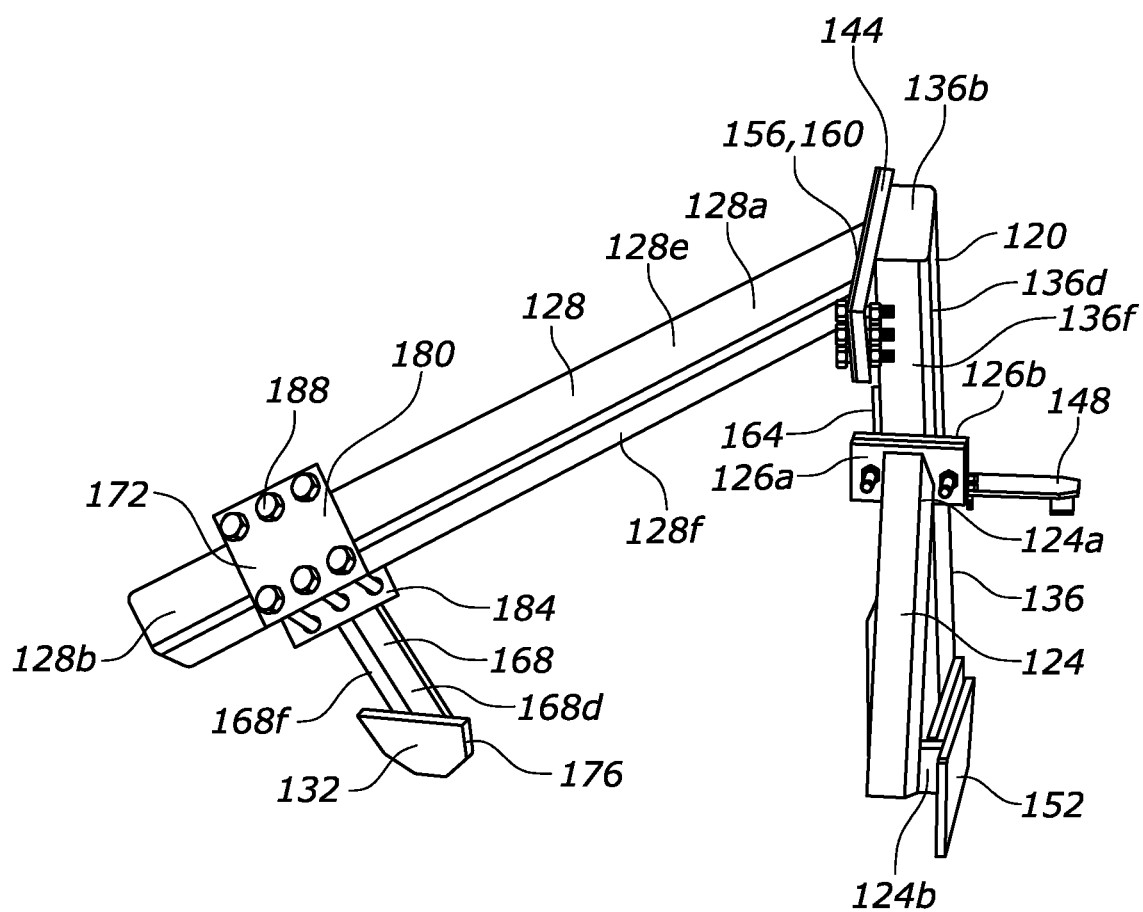
FIG. 5 is a back perspective view of the scraper of FIG. 4.
Figure 8:
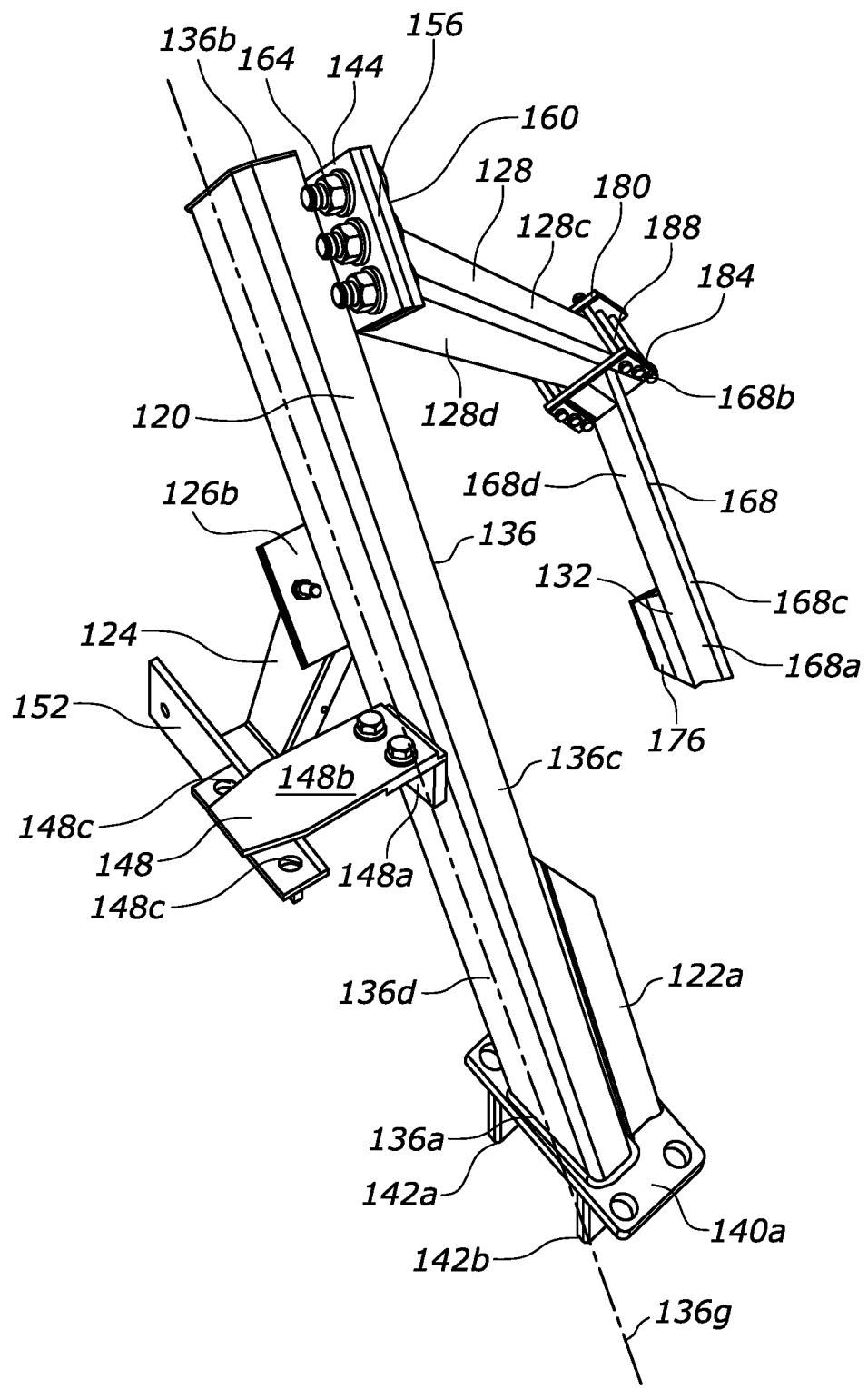
FIG. 8 is a different front, perspective view of the scraper of FIG. 4.

While the scraper 100 may be attached to various locations on the vehicle 104 depending on the tire configuration and overall layout of the vehicle 104, FIG. 1 illustrates the scraper 100 attached to a front right side of a combine and is suspended above and at least partially from the rear of the first and second tires 112a, 112b. So configured, as the vehicle 104 moves forward, or the first and second tires 112a, 112b turn clockwise, any debris disposed or built-up in the gap 114 is subsequently dislodged and removed by the scraper 100. While not shown in FIG. 1, a similar scraper 100, such as the scraper 100 illustrated in FIGS. 4, 5, and 8, may be attached to a left front set of tires of the combine 104 in a similar manner. For the left set of tires, the scraper 100 may be a mirror-image of the scraper 100 shown in FIG. 1. Accordingly, because the scraper 100 of FIGS. 1-3 and the scraper 100 of FIGS. 4, 5, and 8 are mirror images of one another relative to the longitudinal axis of the vehicle 104, the same, or similar, reference numbers will be used for the same components between the scraper 100 of FIGS. 1-3 and the scraper 100 of FIGS. 4, 5, and 8.

Figure 2:
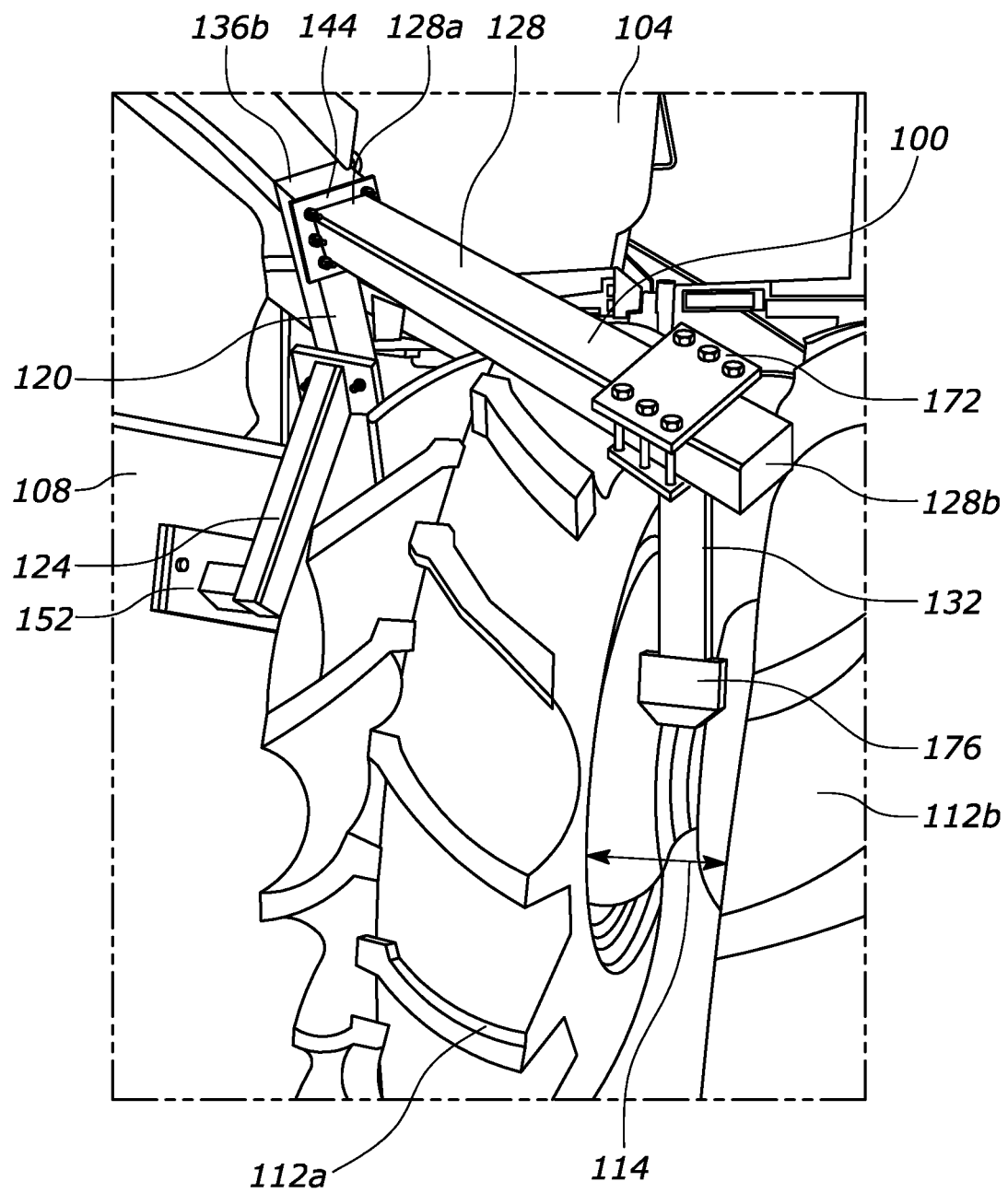
FIG. 2 is a magnified, perspective view of the scraper of FIG. 1.

As shown in FIG. 2, the scraper 100 is attached to the body 108 of the vehicle 104 and has a portion that extends at least partially within the gap 114 between the first and second tires 112a, 112b. The scraper 100 includes a tower 120, a bracing arm 124, an extension arm 128, a paddle 132, and a support arm 148. In the illustrated example, the scraper 100 attaches to the body 108 of the vehicle 104 at three locations. The tower 120 attaches to the axle 116 at a location inward relative to both first and second tires 112a, 112b of the vehicle 104 (FIG. 3), the bracing arm 124 attaches to a chassis or other portion of the of the vehicle 104, and the support arm 148 provides additional bracing to the tower 120 and also attaches to the chassis of the vehicle 104. In the illustrated example, the scraper 100 is attached to existing components or features, such as, for example, brackets, hooks, rings, flanges, apertures, etc., of the vehicle 104. However, in other examples, the scraper 100 may be arranged to contact the vehicle 104 at various locations and to various portions of the body 108.

So configured, the bracing arm 124 limits rotation of the tower 120 relative to the axle 116 of the vehicle 104 (i.e., forward and backward movement relative to the longitudinal axis 110 of the vehicle 104), and the support arm 148 limits tilting or bending of the tower 120 relative to the body 108 of the vehicle 104 (i.e., inward and outward movement relative to the longitudinal axis 110). As such, the bracing arm 124 and support arm 148 limit the degrees of freedom of the tower 120 to maintain the tower 120 in a relatively upright and supportive position while resisting twisting, bending, and rotating of the tower 120 during use of the scraper.

The paddle 132 of the scraper 100 also extends into the gap 114 between the first and second tires 112a, 112b from above a height of the first and second tires 112a, 112b. In particular, the extension arm 128 is coupled to the tower 120 at a location on the tower 120 that is higher than a height of the first and second tires 112a, 112b. The paddle 132 is coupled to the extension arm 128 and extends at an angle into the center of the gap 114 between the first and second tires 112a, 112b. This configuration and orientation reduces, or eliminates, the number of surfaces on which debris can accumulate on the scraper 100 as the paddle 132 removes debris from between the first and second tires 112a, 112b.

Figure 6:
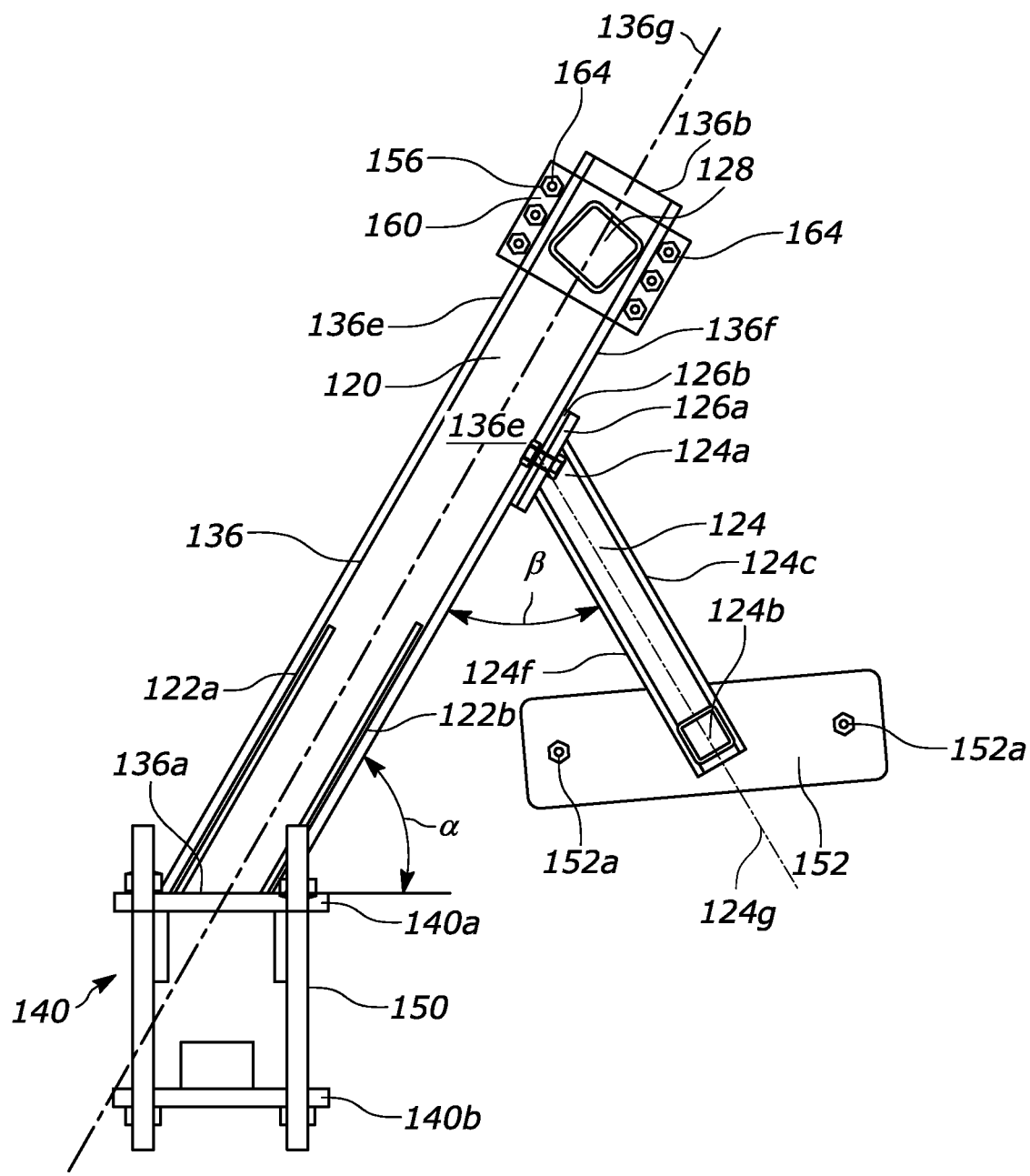
FIG. 6 is a side view of the scraper at section A-A of FIG. 4.

Turning now to FIGS. 4-8, the tower 120 suspend the paddle 132 from a height above the tires 112a, 112b. The tower 120 includes a tower body 136, a tower coupling mechanism 140 (FIGS. 3, 6 and 7) that attaches the tower body 136 to a first portion of the vehicle 104, and a tower coupling plate 144 (FIGS. 7 and 8) that attaches the tower body 136 to the extension arm 128. As shown in FIG. 6, the tower body 136 extends upwardly from the axle 116 at an angle α relative to the longitudinal axis (or horizontal) toward the rear 108b of the body 108 of the vehicle 104 (FIGS. 1 and 2).

In the illustrated example, the tower body 136 has a rectangular cross-section with rounded edges. In particular, the tower body 136 has a first end 136a, a second end 136b opposite the first end 136a, a first surface 136c, a second surface 136d, a third surface 136e, and a fourth surface 136f, and a longitudinal axis 136g (FIGS. 6 and 8) that extends between the first and second ends 136a, 136b. Each of the first, second, third, and fourth surfaces 136c-f extends from the first end 136a to the second end 136b of the tower body 136. The first surface 136c is parallel to the fourth surface 136f and the second surface 136d is parallel to the third surface 136e. Further, the first surface 136c has a first width, the second surface 136d has a second width, the third surface 136e has a third width, and the fourth surface 136e has a fourth width. In some example towers 120, such as the tower 120 illustrated in FIGS. 4-8, the first width can be substantially similar to the fourth width and the second width can be substantially similar to the third width. In such an example, the first and fourth widths are less than the second and third widths. However, in other examples, the first and fourth widths can be greater than the second and third widths or the first, second, third, and fourth widths can be equal to one another. While the tower body 136 is illustrated as having a rectangular cross-section, the tower body 136 may have different cross-sectional shapes in other examples. For example, the tower body 136 can have a single surface and a cylindrical cross-section, three surfaces and a triangular cross-section, four surfaces and a square cross-section, five surface and a pentagonal cross-section, six surfaces and a hexagonal cross-section, or any other polygonal shape.

Additionally, the tower body 136 includes first and second parallel fins 122a, 122b extending outwardly from the third surface 136e at the first end 136a of the tower 120. These fins 122a, 122b may provide additional stability and rigidity to the tower 120. In other examples, the tower 120 may not include any fins.

Turning back to FIG. 3, the tower coupling mechanism 140 releasably attaches the tower 120 to the axle 116 of the vehicle 104 and includes a first plate 140a, a second plate 140b, and a plurality of fasteners 150 that secure the first and second plates 140a, 140b together. The first and second plates 140a, 140b of the tower coupling mechanism 140 clamp the first end 136a of the tower 120 to the first portion of the vehicle (e.g., the axle 116). The axle 116 includes a flat portion upon which the first and second plates 140a, 140b can engage for clamping. Clamping the first and second plates 140a, 140b of the tower coupling mechanism 140 to the axle 116 limits rotation of the tower 120 relative to the axle 116.

Figure 7:
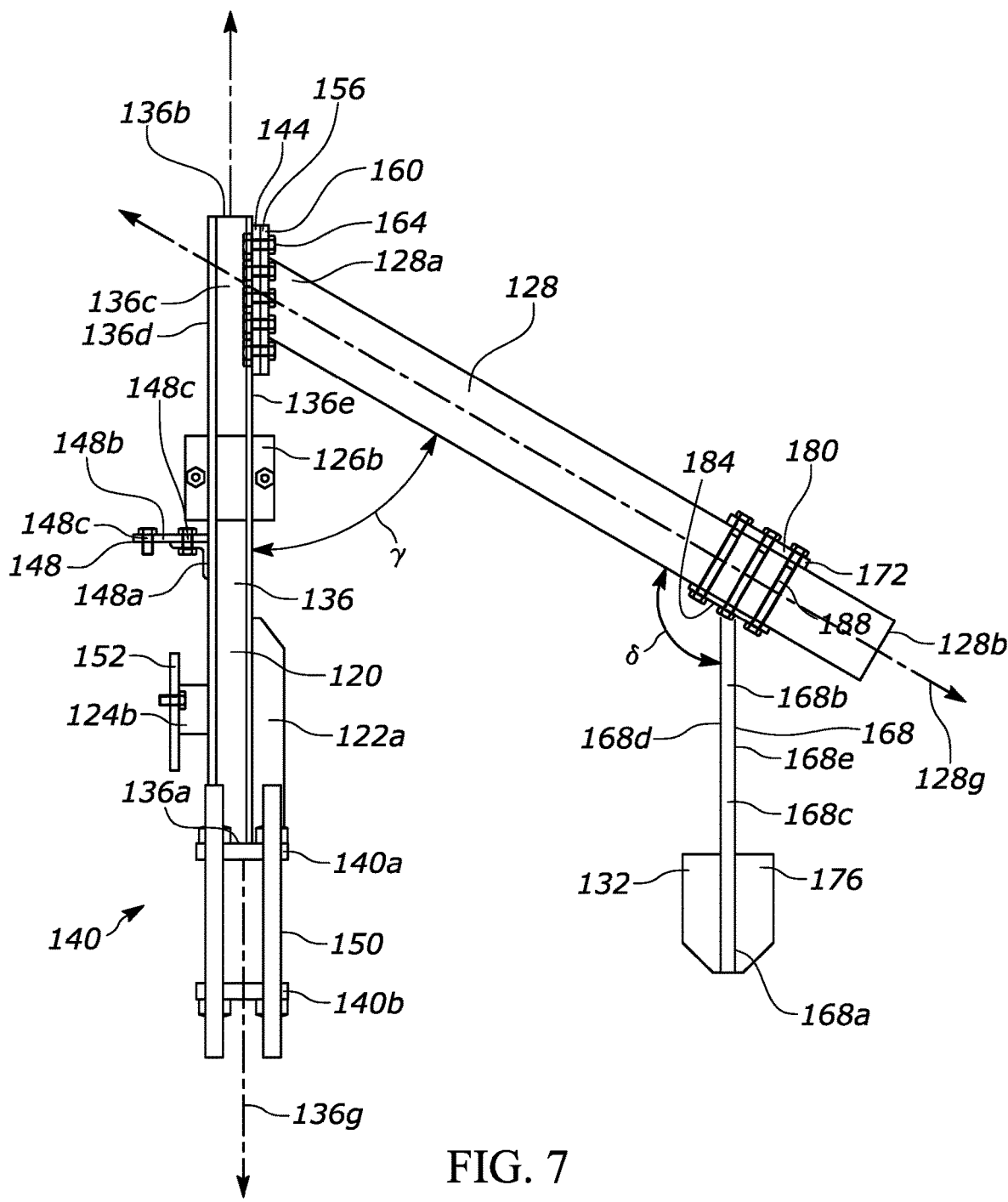
FIG. 7 is front view of the scraper of FIG. 4.

In FIGS. 6 and 7, the first plate 140a is securely attached to the first end 136a of the tower 136 and has a rectangular shape. In FIG. 6, the first plate 140a may be situated parallel to the longitudinal axis 110 of the vehicle 104 so that the first angle α between the tower 120 and the first plate 140a of the tower coupling mechanism 140 is acute. Specifically, the first angle α between the first plate 140a of the tower coupling mechanism 140 and the fourth surface 136f of the tower 120 is less than 90°. For example, the first angle α may be in a range of approximately 10° to approximately 90°, and preferably approximately 60°. As shown in FIGS. 4 and 8, flanges 142a, 142b extend perpendicular relative to the first plate 140a to help align the first end 136a with the axle 116 of the vehicle 104 when mounting the tower 120 to the vehicle 104. In the illustrated example, the first plate 140a and first and second flanges 142a, 142b are fixedly attached to the tower body 136 by welding, for example. The second plate 140b is substantially similar in shape and size to the first plate 140a and is positioned on an opposite side of the axle 116 than the first plate 140a. The plurality of bolts 150 extends through complementary openings in the first and second plates 140a, 140b thereby securing the tower 120 to the axle 116. Once the plurality of bolts 150 secure the first and second plates 140a, 140b to the axle 116 of the vehicle 104, the tower coupling mechanism 140 clamps the axle 116 thereby limiting rotation of the tower 120 relative to the axle 116. In other examples, however, the tower coupling mechanism 140 can be secured to the axle 116 by other methods. While the exemplary first and second plates 140a, 140b each have a rectangular shape, the first and second plates 140a, 140b may have other shapes and may be a different shape from one another. For example, the first or second plates 140a, 140b can be triangular, circular, pentagonal, hexagonal, or any other polygonal shape that may be best secure the tower 120 to the axle 116.

Some embodiments may be described using the expression "coupled" and "releasably coupled" along with their derivatives. For example, some embodiments may be described using the term "coupled" or "releasably coupled" to indicate that two or more elements are in direct physical contact. The terms "coupled" and "releasably coupled," however, may also mean that two or more elements are not in direct contact with each other, but yet still co-operate or interact with each other. The embodiments are not limited in this context.

As illustrated in FIG. 2, the extension arm 128 extends from the second end 136b of the tower 120 at an angle such that the extension arm 128 spans across the first tire 112a and toward the rear 108b of the vehicle 104 such that at least a portion of the extension arm 128 is disposed above the height of the first and second tires 112a, 112b. In FIGS. 4-6 and 8, the tower coupling plate 144 is fixedly attached to the tower 120 proximate the second end 136b of the tower 120. In particular, the tower coupling plate 144 is attached to the third surface 136e. Thus, as shown in FIG. 2, the tower coupling plate 144 faces away from the vehicle 104 thereby attaching to the extension arm 128 in a manner that allows the extension arm 128 to extend away from both the tower 120 and the vehicle 104 (FIG. 2). The tower coupling plate 144 has a generally rectangular shape and includes a plurality of apertures 144a (FIG. 8) each of which is adapted to receive a fastener (e.g., a bolt). While the tower coupling plate 144 is illustrated as having a rectangular shape, the tower coupling plate 144 may have a different shape in other examples. For example, the tower coupling plate 144 can have a triangular shape, a circular shape, a pentagonal shape, a hexagonal shape, or any other polygonal shape.

As best illustrated in FIGS. 7 and 8, a support arm 148 is coupled to an inwardly facing surface 136d of the tower 120 at a location between the first and second ends 136a, 136b of the tower 120. In the illustrated example of FIG. 8, the support arm 148 attaches to the tower 120 below a point of connection between the bracing arm 124 and the tower 120 relative to the longitudinal axis 136g of the tower 120. The support arm 148 extends outwardly from the tower 120 to engage (e.g., releasably couple to) a portion of the body 108 of the vehicle 104 and is perpendicular relative to the longitudinal axis 136g of the tower 120. So configured, the support arm 148 may provide additional stability to the tower 120 and anchors the tower 120 to the vehicle in a way that minimizes movement inward and outward relative to the vehicle body 108. The support arm 148 has a first portion 148a and a second portion 148b that is substantially perpendicular to the first portion 148a. The first portion 148a of the support arm 148 is securely attached (e.g., welded) to the second surface 136d of the tower body 136. The second portion 148b, which can be integrally formed with or securely attached to the first portion 148a, extends outwardly from the first portion 148a such that the second portion 148b is substantially perpendicular to the second surface 136d of the tower body 136. The second portion 148b also includes a plurality of apertures 148c which may be used to releasably couple the support arm 148, and ultimately the tower 120, to a portion of the body 108 of the vehicle 104. For example, a fastener (e.g., a bolt) can be placed through each aperture of the plurality of apertures 148 and used to releasably couple the support arm 148 to preexisting mounting holes or apertures on the body 108 of the vehicle 104. In other examples, however, the second portion 148b of the support arm 148 can be welded to the body 108 of the vehicle 104 instead of or in addition to the fasteners.

So configured, the support arm 148 braces the tower 120 to prevent movement inwardly and outwardly relative to the longitudinal axis 110 of the vehicle 104, or in other words, movement toward and away from the vehicle body 108. The support arm 148 prevents a bending moment of the tower 120 relative to the axle 116 of the vehicle 104. In another example, the support arm 148 may be positioned differently relative to the body 108 of the vehicle 104 to attach an inwardly facing surface 136d of the tower 120 with a portion of the vehicle 104.

The shape, configuration, and position of the first portion 148a and/or the second portion 148b of the support arm 148 relative to the tower 120 may vary depending on the configuration of the body 108 of the vehicle 104. In particular, as discussed above, the support arm 148 attaches to preexisting mounting holes or apertures disposed on the body 108 of the vehicle 104. Accordingly, the exemplary support arm 148 has a rectangular shaped body having a plurality of openings that align with the preexisting mounting holes or apertures disposed on the body 108 of the vehicle 104. However, in other examples, the support arm 148 can have fewer or additional apertures and a can have a differently shaped body such as a square body, a triangular body, a circular body, a trapezoidal body, a pentagonal body, a hexagonal body, or any other polygonal shape. Additionally, the support arm 148 may couple to the tower 120 at a different location to attach to existing features of the vehicle. In another example, the bracing arm 148 may be coupled to the tower at a location closer to the second end 136b.

Turning now to FIGS. 5-8, the bracing arm 124 releasably couples the scraper 100 to the vehicle 104 and is the third point of contact between the scraper 100 and the vehicle 104. The bracing arm 124 is coupled to the rearward facing surface 136f of the tower 120 (i.e., facing a rear 108b of the vehicle 104) to brace the tower 120 from movement in the forward and backward directions, relative to the longitudinal axis 110 of the vehicle 104.

As best illustrated in FIG. 6, the bracing arm 124 is coupled to the tower 120 between the first end 136a of the tower 120 and the extension arm 128. In particular, the bracing arm 124 may be coupled to the tower 120 at a location between a midpoint of the tower 120 and the second end 136b of the tower 120. The bracing arm 124 is secured to the fourth surface 136f of the tower 120 by first and second coupling plates 126a, 126b. The first coupling plate 126a is fixed to a first end 124a of the bracing arm 124 and lays flat against the second coupling plate 126b fixed to the fourth surface 136f of the tower 120. The first and second coupling plates 126a, 126b are secured together by a plurality of fasteners. However, in another example, the bracing arm 124 may be coupled to the tower 120 by an adjustable coupling mechanism so that the bracing arm 124 may be adjusted relative to the tower. As such, the angle at which the tower extends from the axle 116 would also be adjustable.

As a vehicle 104 moves forward (for example, in a clockwise direction from a right side view), the scraper 100 encounters and removes debris lodged between the first and second tires 112a, 112b and experiences an opposite force (for example, in a counterclockwise direction) against the paddle 132 which is transmitted to the tower 120. The bracing arm 124 is coupled to the tower 120 at a location that may absorb and/or counteract some or all of the torque exerted on the tower 120 transferred from the paddle 132, thereby stabilizing the tower 120. The bracing arm 124, accordingly, is a different point of contact between the tower 120 and the vehicle 104.

The bracing arm 124 has a first end 124a, a second end 124b opposite the first end 124a, and a longitudinal axis 124g extending between the first and second ends 124a, 124b. In the illustrated example, the bracing arm 124 has a substantially rectangular cross-section and includes a first surface 124c, a second surface 124d, a third surface 124e, and a fourth surface 124f. The first end 124a of the bracing arm 124 is coupled to and extends from the fourth surface 136f of the tower 120 at a second angle β. Specifically, the second angle β is measured between the longitudinal axis 136g of the tower 120 and a longitudinal axis 124g of the bracing arm 124. By keeping the second angle β less than 90 degrees, the bracing arm 124 engages the tower 120 at an angle that may most efficiently supports the tower 120 and absorbs, or resists, rotation of the tower 120 during use. For example, the second angle β can be in a range of approximately 10° to approximately 90°, and preferably, the second angle β is approximately 60°. The second end 124b of the bracing arm 124 is configured to couple to a second portion of the vehicle 104 (e.g., the body, the chassis, the frame) at a location different than the tower connection point and the support arm connection point.

While the bracing arm 124 is illustrated as having a substantially rectangular cross-section, the bracing arm 124 may have different cross-sectional shapes in other examples. For example, the bracing arm 124 can have one surface and a circular cross-section, three surfaces and a triangular cross-section, four surfaces and a square cross-section, five surface and a pentagonal cross-section, six surfaces and a hexagonal cross-section, or any other polygonal shape.

The bracing arm 124 further includes a bracing coupling plate 152 that is coupled proximate to the second end 124b of the bracing arm 124 and extends perpendicularly relative to the longitudinal axis 136g (FIGS. 6 and 8) of the tower 120. The bracing coupling plate 152 is configured to releasably secure the bracing arm 124 to the body 108 of the vehicle 104. In particular, the bracing coupling plate 152 has a generally rectangular shape with a plurality of apertures 152*a* that are oriented concentrically thereon with preexisting mounting holes or apertures on the body 108 of the vehicle 104. Each aperture in the plurality of apertures 152 may be configured to receive a fastener (e.g., a bolt, screw) that extends through the aperture of the bracing coupling plate 152 and the preexisting mounting holes or apertures on the body 108 of the vehicle 104. In other examples, the bracing coupling plate can be welded, or otherwise securely attached, to the body 108 of the vehicle 104 instead of or in addition to the fasteners. While the bracing coupling plate 152 has been illustrated and discussed as having a generally rectangular shape, the bracing coupling plate 152 may have a different shape and size depending on the location and type of existing features of the vehicle 104. For example, the bracing coupling plate 152 can have a square shape, a triangular shape, a circular shape, a trapezoidal shape, pentagonal shape, hexagonal shape, or any other polygonal shape. Additionally, the bracing coupling plate 152 may be disposed closer to or further from the rearward facing side 136*f* of the tower 120.

Turning now to FIG. 7, the extension arm 128 is coupled to the tower 120 and extends outwardly from the tower 120 relative to the longitudinal axis 110 of the body 108. Turning back briefly to FIG. 2, the extension arm 128 extends from the tower 120 at a point on the tower 120 that is higher than the height of the first and second tires 112*a*, 112*b*. The extension arm 128 extends downwardly toward the first and second tires 112*a*, 112*b* and outwardly from the tower 120 (and the vehicle 104). Additionally, the extension arm 128 attaches to the tower 120 so that the extension arm 128 extends further in a direction toward the rear of the vehicle 104. So configured, the extension arm 128 is out of the way of debris being removed from the gap 114 between the first and second tires 112*a*, 112*b* and oriented in a manner that reduces, if not eliminates, the number of surfaces on the scraper 100 on which debris can build-up.

The extension arm 128 has a substantially square cross-section and has a first end 128*a*, a second end 128*b* opposite the first end 128*a*, a first surface 128*c*, a second surface 128*d*, a third surface 128*e*, and a fourth surface 128*f*. The first end 128*a* of the extension arm 128 is releasably coupled to the tower 120 at a third angle γ. As shown in FIG. 7, the angle γ between a longitudinal axis 128*g* of the extension arm 128 and the longitudinal axis 136*g* of the tower 120 is less than 90°. For example, the third angle γ can be in a range of approximately 10° to approximately 90°, and preferably 60°. However, the third angle γ may vary depending on a number of considerations. For example, the third angle γ can be varied depending on the vehicle 104, depending on the size of the first and second tires 112*a*, 112*b* being used on the vehicle 104, the distance between the first and/or second tires 112*a*, 112*b* and the body 108 of the vehicle 104, and/or the gap 114 between the first and second tires 112*a*, 112*b*.

Turning briefly to FIG. 2, because the extension arm 128 is coupled to the tower 120 at an acute angle, the second end 128*b* of the extension arm 128 is disposed below the height of the first and second tires 112*a*, 112*b*. The tower 120 thereby suspends the paddle 132 above the center of the first and second tires 112*a*, 112*b* via the extension arm 128. The extension arm 128 is not parallel to the horizontal, and is instead angled relative to the tower 120 to allow for adjustability of the paddle 132 and to avoid any horizontal or parallel surfaces with the ground that could potentially receive mud or debris build up. As shown in FIG. 6, the orientation of the extension arm 128 is also arranged such that each of the surfaces of the extension arm is sloped relative to the horizontal. In other words, the cross-section of the extension arm 128 is pitches so that each surface is sloped downwards. Accordingly, such an orientation minimizes the number of surfaces on the extension arm 128 and the paddle 132, on which debris can build-up or accumulate. As will be discussed later, orienting the extension arm 128 in this manner also allows the paddle 132 to enter and be disposed in the gap 114 between the first and second tires 112*a*, 112*b* at a point above the center of the first and second tires 112*a*, 112*b*. Additionally, the extension arm 128 may also act as an additional scraper of mud collected on the top of the tires 112*a*, 112*b*.

As shown in FIGS. 4 and 5, the first surface 128*c* is substantially parallel to the fourth surface 128*f* and the second surface 128*d* is substantially parallel to the third surface 128*e*. The first surface 128*c* has a first width, the second surface 128*d* has a second width, the third surface 128*e* has a third width, and the fourth surface 128*e* has a fourth width. The first, second, third, and fourth widths are all substantially similar in size. While the extension arm 128 is illustrated as having a substantially square cross-section, the extension arm 128 may have different cross-sectional shapes in other examples. For example, the extension arm 128 can have one surface and a circular cross-section, three surfaces and a triangular cross-section, four surfaces and a rectangular cross-section, five surface and a pentagonal cross-section, six surfaces and a hexagonal cross-section, or any other polygonal shape.

As illustrated in FIGS. 6 and 7, the extension arm 128 also includes an extension arm coupling mechanism 156 that releasably couples the extension arm 128 to the tower 120. In particular, the extension arm coupling mechanism 156 includes an extension arm plate 160 and a plurality of bolts 164 that extends through the extension arm plate 160 and the tower coupling plate 144 thereby securing the extension arm 128 to the tower 120. The extension arm plate 160 is securely attached to the first end 128*a* of the extension arm 128 via, for example, welding. In other examples, the extension arm plate 160 can be integrally formed with the extension arm 128 or attached by other known methods. While the extension arm plate 160 is discussed and illustrated as being releasably coupled to the tower coupling plate 144 via fasteners (e.g., the plurality of bolts 164), the extension arm plate 160 may be secured to the tower coupling plate 144 in a different manner. For example, the extension arm plate 160 can be welded to the tower coupling plate 144 instead of or in addition to the plurality of bolts 164. The extension arm plate 160 has a substantially rectangular shape and is securely attached to the first end 124*a* of the extension arm 124. However, in other examples, the extension arm plate 160 can have a circular shape, a square shape, a triangular shape, a trapezoidal shape, pentagonal shape, hexagonal shape, or any other polygonal shape.

As illustrated in FIGS. 4, 5, 7, and 8, the paddle 132 is suspended from the tower 120. In particular, the paddle 132 is coupled to the extension arm 128 extending from the tower 120. As shown in FIG. 7, the extension arm 128 extends downwardly from the tower 120 and the paddle 132 extends downwardly from the extension 128. So, by way of the extension arm 128, the tower 120 suspends the paddle 132 at a location between the first and second tires 112*a*, 112*b* of the vehicle 104 (FIGS. 1 and 3). Suspending the paddle 132 from above a height each of the first and second tires 112*a*, 112*b* places the paddle 132 in a location relative to the first and second tires 112*a*, 112*b* where debris removed by the paddle 132 is the least likely to accumulate. In other words, suspending the paddle 132 from the tower 120 minimizes the number of surfaces on which debris can accumulate.

Turning briefly back to FIG. 2, the paddle 132 is coupled proximate to the second end 128b of the extension arm 128 and extends downwardly relative to the longitudinal axis 110 (FIG. 1) of the body 108 such that the paddle 132 is at least partially disposed in the gap 114 between the first and second tires 112a, 112b. So configured, the paddle 132 encounters debris built-up in the gap 114 between the first and second tires 112a, 112b as the first and second tires 112a, 112b rotate clockwise (i.e., the vehicle 104 is moving forward). Accordingly, the position of the paddle 132 in the gap 114 relative to the center of the first and second tires 112a, 112b may vary depending on the size of the gap 114, the size of the first and second tires 112a, 112b, the size of the paddle 132, and/or the shape of the paddle 132. For example, a fourth angle δ (FIG. 7) measured between the longitudinal axis 128g of the extension arm 128 and the paddle 132 may be less than 180°. In some examples, the fourth angle δ can be in a range of approximately 60° to approximately 150°. In the illustrated example of FIG. 7, the fourth angle δ is approximately 120°.

Turning back now to FIGS. 4, 5, 7, and 8, the paddle 132 includes a paddle arm 168, a paddle coupling mechanism 172 coupled to a second end 168b of the paddle 132, and a blade 176 coupled to the first end 168a of the paddle arm 168. The paddle arm 168 has a sufficient rigidity to withstand coming into contact with various types of debris. For example, the paddle arm 168 is sufficiently rigid to remove both heavy, wet mud and hardened, dried mud. The paddle arm 168 has a substantially rectangular cross-section and includes a first end 168a that is at least partially disposed in the gap between the first and second tires 112a, 112b, a second end 168b opposite the first end 168a and coupled to the extension arm 128, a first surface 168c, a second surface 168d, a third surface 168e opposite the second surface 168d, and a fourth surface 168f opposite the first surface 168c. The first end 168a of the paddle arm 168 is at least partially disposed in the gap 114 between the first and second tires 112a, 112b. In particular, the blade 176 is disposed above the center of the first and second tires 112a, 112b.

The first surface 168c is substantially parallel to the fourth surface 168f and the second surface 168d is substantially parallel to the third surface 168e. Further, the first surface 168c has a first width, the second surface 168d has a second width, the third surface 168e has a third width, and the fourth surface 168e has a fourth width. The first width is substantially similar to the fourth width and the second width is substantially similar to the third width. The first and fourth widths are less than the second and third widths. While the paddle arm 168 is illustrated as having a substantially rectangular cross-section, the paddle arm 168 may have different cross-sectional shapes in other examples. For example, the paddle arm 168 can have one surface and a circular cross-section, three surfaces and a triangular cross-section, four surfaces and a square cross-section, five surface and a pentagonal cross-section, six surfaces and a hexagonal cross-section, or any other polygonal shape. Additionally, the length of the paddle arm 168 may be different to account for the dual-tire configuration.

As illustrated in FIG. 7, the paddle coupling mechanism 172 is disposed at the second end 168b of the paddle arm 168 and releasably couples the paddle 132 to the extension arm 128. In other words, the paddle 132 is adjustably connected to the second end of the extension arm 128. In fact, the paddle coupling mechanism 172 can secure the paddle 132 anywhere on the extension arm 128 between the first and second ends 128a, 128b of the extension arm 128. Accordingly, the paddle coupling mechanism 172 allows a user to vary the location of the paddle 132 along the extension arm 128 and compensate for different tire configurations and different vehicle configurations. The paddle coupling mechanism 172 includes a first plate 180, a second plate 184, and a plurality of bolts 188 that extends through the first and second plates 180, 184. The first plate 180 is securely attached to the second end 168b of the paddle 132 and abuts the second surface 128d of the extension arm 128 when the paddle 132 is coupled to the extension arm 128. The second plate 184 is disposed on the third surface 128e of the extension arm 128 opposite of the first plate 180, which is disposed against the first surface. While the first and second plates 180, 184 are discussed and illustrated as being secured to one another, and ultimately the extension arm 128, using a plurality of bolts 188, the first and second plates 180, 184 can be welded to the extension arm 128. In such an example, the paddle 132 would be fixed in place and immovable, unlike the paddle coupling mechanism 172 of FIG. 7. The first and second plates 180, 184 are both substantially similar in shape. As illustrated in FIGS. 4, 5, and 8, the first and second plates 180, 184 have a rectangular shape. However, in other examples, the first and second plates 180, 184 can have a circular shape, a triangular shape, a square shape, a trapezoidal shape, a pentagonal shape, a hexagonal shape, or any other polygonal shape.

Turning back to FIG. 7, the first end of the paddle includes the blade 176, which is sized to fit in the gap 114 between the first and second tires 112a, 112b thereby removing debris that is disposed in the gap 114. Accordingly, the shape of the blade 176 may vary depending on the size of the gap 114 between the first and second tires 112a, 112b, the shape of the rims, and the type of debris expected to be disposed between the first and second tires 112a, 112b. The blade 176 is sized and shaped so that no part of the blade 176 actually touches or engages either the first or second tires 112a, 112b. Accordingly, in some examples, the blade 176 can be sharp and capable of cutting through the debris. In other examples, however, the blade 176 can be blunt and unable to cut through the debris. While the blade 176 is illustrated and discussed as being attached to the first end 168a of the paddle arm 168, in some examples, the blade 176 can be releasably coupled to the first end 168a of the paddle arm 168. In such an example, the blade 176 can be interchangeable with other blades 176 of substantially similar shape if one breaks and/or with a differently shaped blade 176 if a tire configuration changes or if the type of debris built-up in the gap 114 between the first and second tires 112a, 112b changes.

In the example illustrated in FIGS. 4, 5, and 8, the blade 176 is shaped substantially similar to a shovel. The blade 176 includes opposite surfaces that may be flat or curved. The blade 176 is disposed at the first end 168a of the paddle arm 168 such that the fourth side 176d of the blade 176 is substantially even with the first end 168a of the paddle arm 168. While the blade 176 is illustrated as having a shape substantially similar to a shovel, the blade 176 may be different shapes in other examples. For example, the blade 176 can be a square, a rectangle, a triangle, a circle, a trapezoid, a pentagon, a hexagon, or any other polygonal shape, and customized to fit between two tires. Additionally, the various surfaces may be angled, curved, corrugated, or shaped to facilitate removal and release of debris. The blade 176 may be customized in dimension, material, and shape to accommodate various dual-tire configurations.

The scraper 100 may be assembled and secured to the vehicle 104 in various ways depending on the type of vehicle, the equipment available to the user, and the weight of the scraper parts. In a preferred method of assembly, the individual components of the scraper 100 are attached to the vehicle 104 instead of assembling the entire scraper 100 beforehand. In this example, the tower 120 is first coupled to the axle 116 of the vehicle 104 by securing the first end 136a of the tower 120 to the axle 116 of the vehicle 104 via the tower coupling mechanism 140. The fasteners 150 are secured firmly in place, but not tightened. The bracing arm 124 and the support arm 148 are then attached to the vehicle 104 and then each is bolted to the tower 120. In particular, the bracing coupling plate 152 can be coupled to preexisting mounting apertures or holes in the body 104 (e.g., frame, chassis) of the vehicle 104 using fasteners (e.g., bolts). The first end of the 124a of the bracing arm 124 can then be coupled to the fourth surface 136f the tower 120 using fasteners (e.g., bolts). In other examples, the bracing arm 124 can be secured to the tower 120 before being secured to the body 108 of the vehicle 104. Finally, all bolts coupled to the tower 120 are tightened to secure tower to the axle and bracing and support arms 124, 148 to the vehicle 104.

Then the extension arm 128 can then be coupled proximate to the second end 136b of the tower 120. In particular, the extension arm coupling mechanism 156 can be aligned with the tower coupling plate 144 and the plurality of bolts 164 can be placed through the extension arm plate 160 and the tower coupling plate 144 thereby securing the extension arm 128 to the tower 120. Lastly, the paddle 132 is positioned between the first and second tires 112a, 112b and then coupled to the extension arm 128. In particular, the paddle coupling mechanism 172 can be used to secure the paddle 132 to the extension arm 128. Once secured, the paddle coupling mechanism 172 can be loosened enough so that the paddle 132, and ultimately the blade 176, can be adjusted.

In another example, the scraper 100 may be entirely assembled before being coupled to the vehicle 104. To mount the scraper 100 to a vehicle 104, the first end 136a of the tower 120 can be coupled to the axle 116 of the vehicle 104 using the tower coupling mechanism 140. The bracing arm plate 152 can then be coupled to preexisting mounting apertures or holes in the body 108 of the vehicle 104 using fasteners thereby coupling the bracing arm 124 to the vehicle 104. Once the tower 120 and the bracing arm plate 152 are secured to the vehicle 104, the position of the paddle 132 along the extension arm 128 may be adjusted until the blade 176 is disposed in the gap 114 between the first and second tires 112a, 112b at a point above a midpoint of the height of the first and second tires 112a, 112b.

While the scraper 100 is described with respect to a dual-tire vehicle 104, the scraper 100 may also be used with a vehicle having a single tire configuration (that is, right and left side tires for each axle). The scraper 100 is similarly attached to the vehicle such that the paddle 132 is suspended from the tower 120 to extend from a height above the height of the tire to a point below the height of the tire. To accommodate the single-tire configuration, the paddle 132 may be adjusted relative to the extension arm 128 so that the blade 176 is either on an interior side of the tire or on an exterior side of the tire relative to the body of the vehicle.

Figure 9:
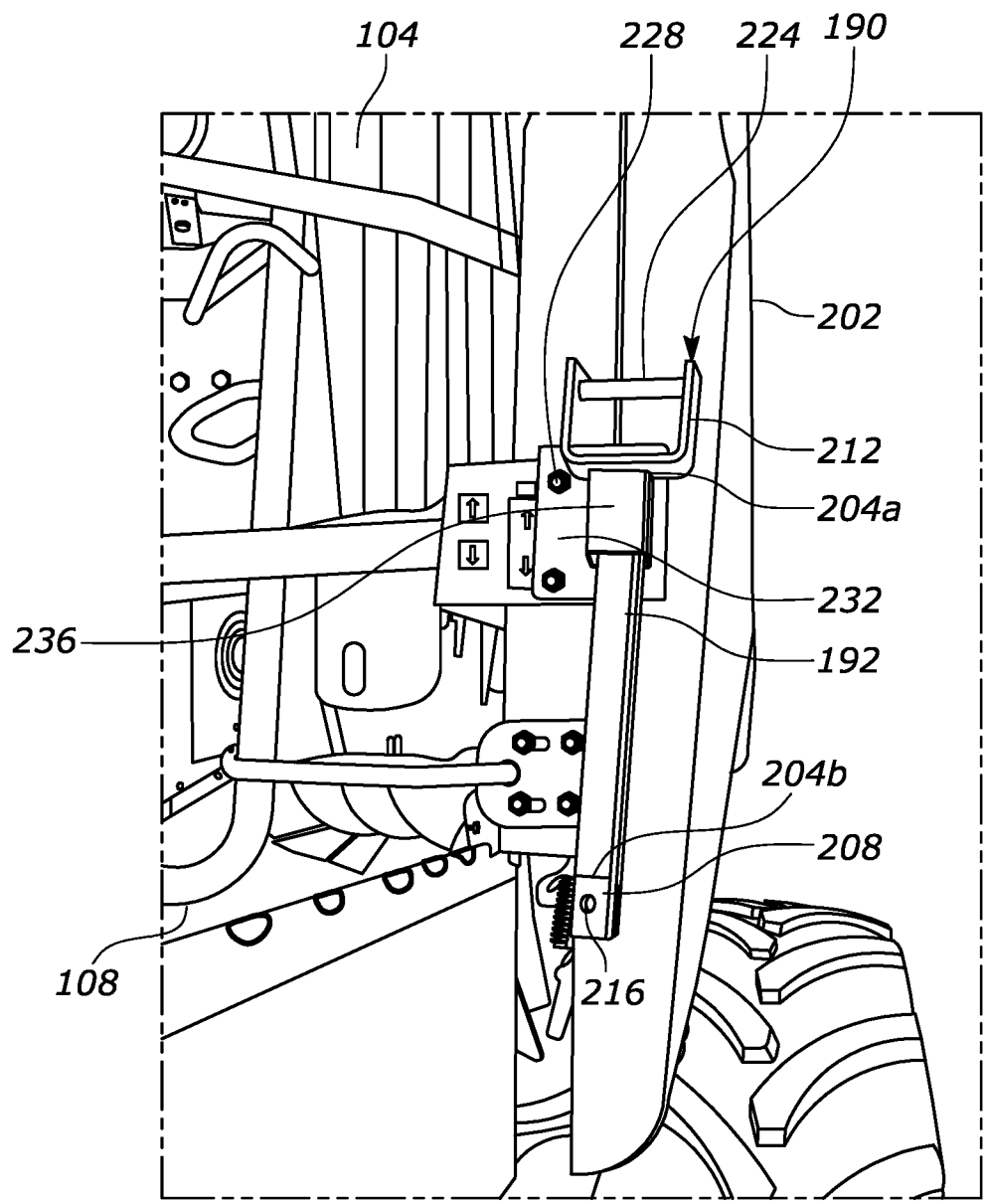
FIG. 9 is a perspective view of a first exemplary panel extension arm assembled in accordance with the teachings of the present disclosure, showing the panel extension arm in a disengaged position.
Figure 10:
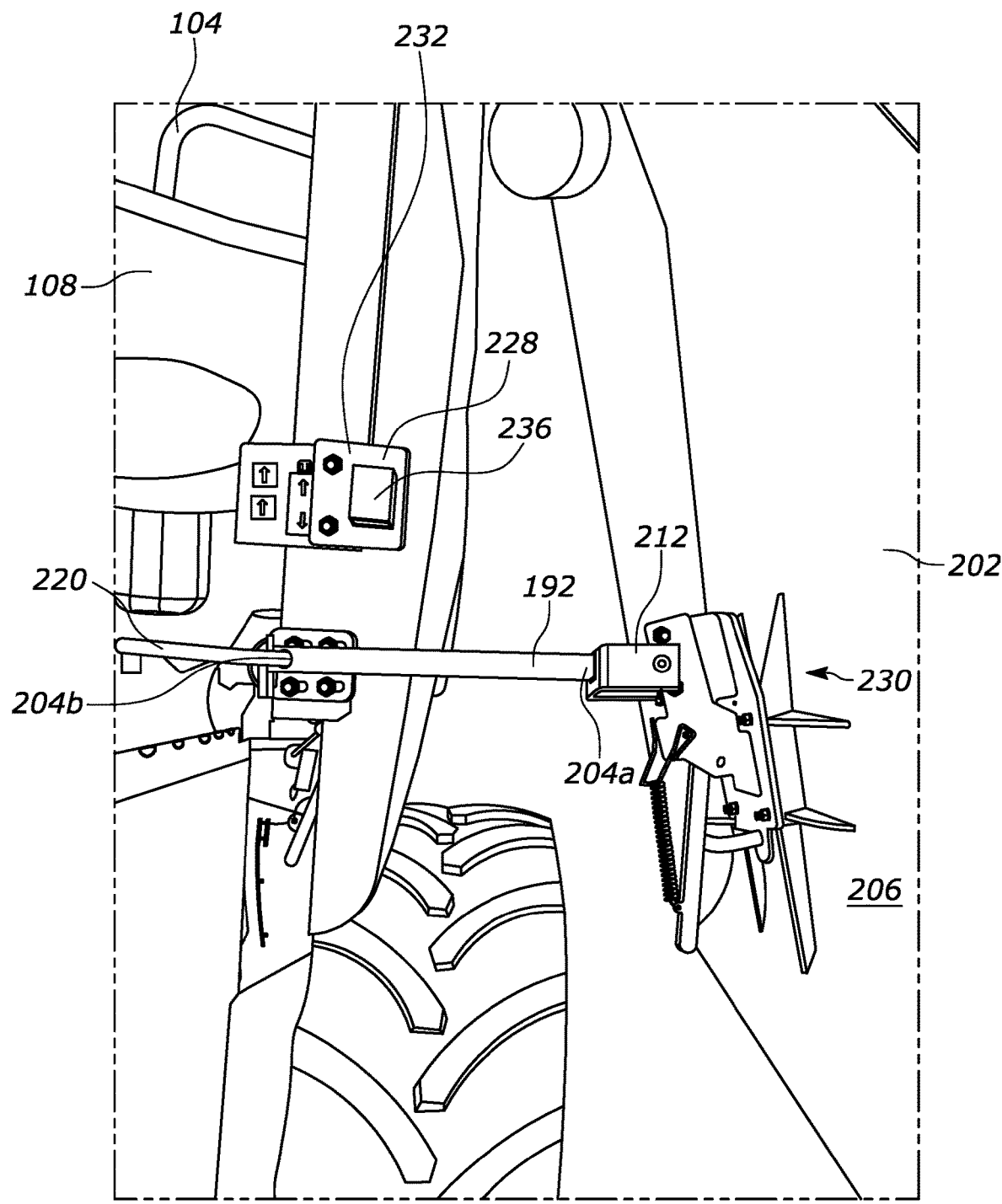
FIG. 10 is a perspective view of the panel extension arm of FIG. 9 in an engaged position.
Figure 11:
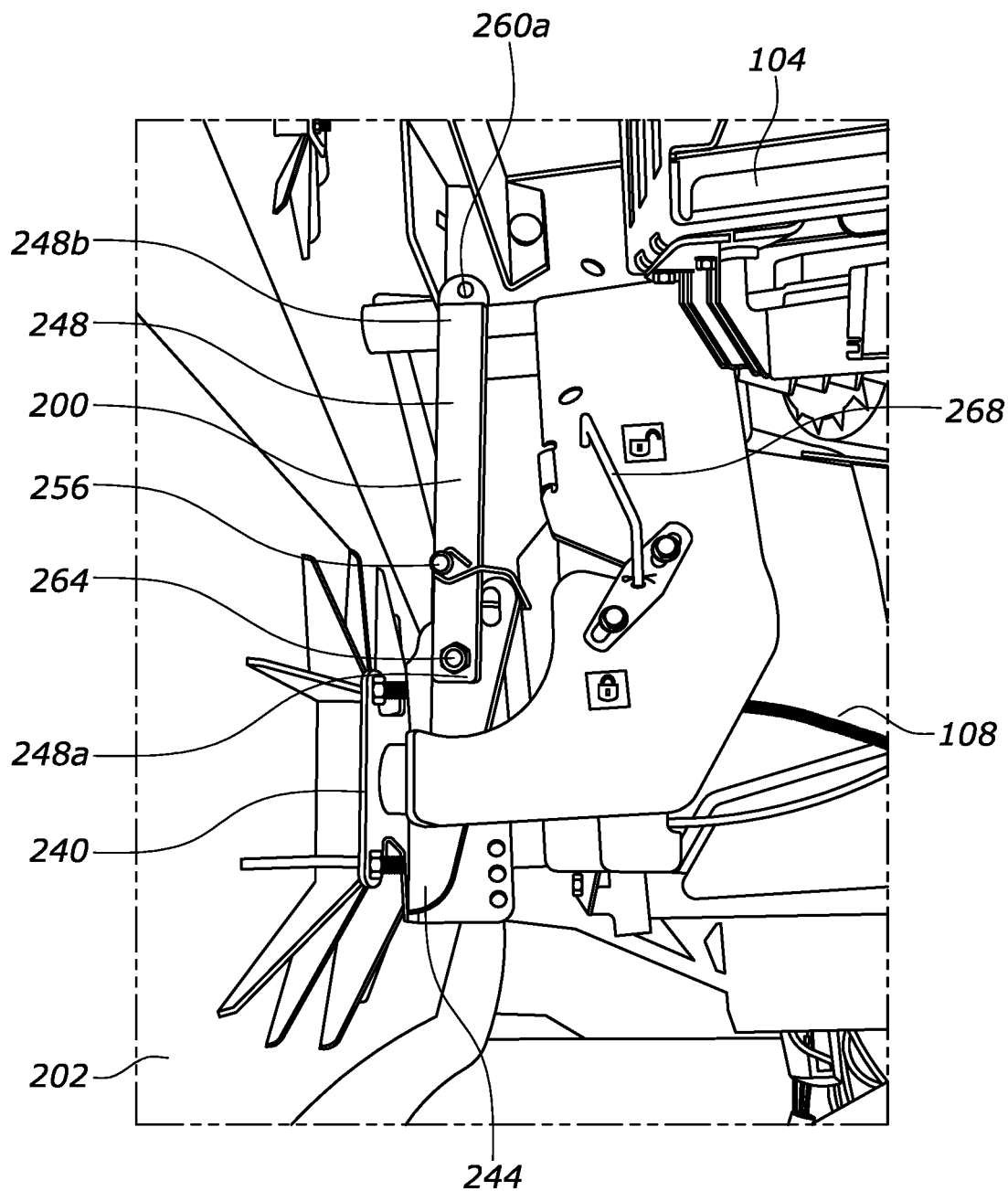
FIG. 11 is a perspective view of a second exemplary panel extension arm assembled in accordance with the teachings of the present disclosure, showing the panel extension arm in a disengaged position.
Figure 12:
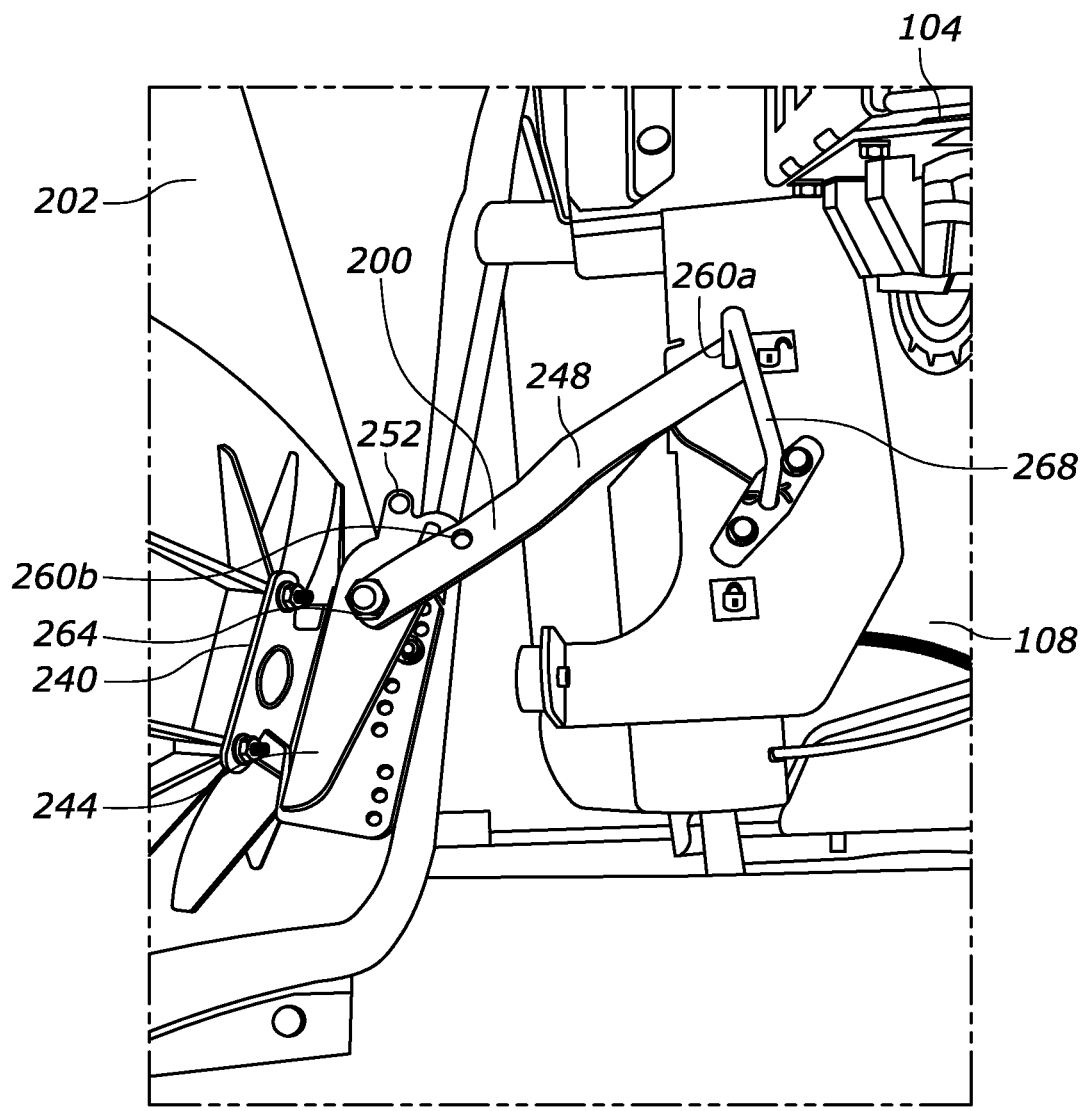
FIG. 12 is a perspective view of the panel extension arm of FIG. 11 in an engaged position.

Turning now to FIGS. 9-12, which illustrate first and second exemplary panel extension arm assemblies 190, 200 that may be used to extend, open, or hold open panels 202 on the vehicle 104 to protect the panels from damage in extremely muddy conditions. In particular, FIGS. 9 and 10 illustrate a first panel extension arm assembly 192 in a disengaged positioned and an engaged position, respectively; and FIGS. 11 and 12 illustrate a second panel extension arm assembly 200 in a disengaged position and an engaged position, respectively. As will be described below, the first and second extension arms provide for more clearance on fiberglass panels of vehicles, which are susceptible to breaks with mud build-up. These extension arm assemblies 190, 200 may be placed on an interior side of vehicle panels so that the panels may be tipped outward from the vehicle and behind the scraper 100 so the scraper 100 protects the panels from additional mud build-up.

The first panel extension arm assembly 190 of FIGS. 9 and 10 includes a an extension arm 192, a plurality of projections 208 extending from the arm 192, and a bracket 212 at a first end 204a of the arm 192. The arm 192 has a first end 204a, a second end 204b opposite the first end 204a, and a generally square cross-section from the first end 204a to the second end 204b. The plurality of projections 208 creates an opening, aperture, groove, or other fitting that receives a bar, or other structure, of the vehicle 104. The projections 208 are disposed at the second end 204b of the body 204 to secure the second end 204b of the first panel extension arm 192 to the bar, or other structure, of the vehicle 104. Each projection in the plurality of projections 208 extends outwardly from the second end 204b of the body 204 and includes an aperture 216 that receives a pin 220, as shown in FIG. 10.

The bracket 212 is disposed at the first end 204a of the body 204 and secures the first end 204a of the body 204 to an interior portion of the panel 202. In particular, the bracket 212 includes a U-shape bracket and a bar 224 that extends between arms of the bracket 212. A holder 228 is attached to the vehicle 104 and releasably receives the first panel extension arm 192 such that the vehicle 104 carries the first panel extension arm 192. As illustrated in FIG. 9 the holder 228 includes a body 232 and a retainer 236. The body 232 has a rectangular shape and includes a plurality of apertures, which receive a plurality of bolts that couple the holder 228 to the body 108 of the vehicle 104. However, in other examples, the body 232 can have a circular shape, a triangular shape, a square shape, a pentagonal shape, a hexagonal shape, or any other polygonal shape. The retainer 236 extends away from the body 232 and forms an opening or passage through which the first panel extension arm 192 can be placed.

As illustrated in FIG. 10, the first panel extension arm 192, when in the engaged position, retains a portion of the vehicle (e.g., a panel 202) in an extended position such that the portion of the vehicle (e.g., the panel 202) is disposed away from the body 108 of the vehicle 104 by a distance. The first panel extension arm 192 may be placed in the engaged position in, for example, three steps. The second end 204b of the body 204 is first placed on a bar, or other structure, of the vehicle 104 such that the plurality of projections 208 receive the bar, or other structure of the vehicle 104. The pin 220 is then placed through the apertures 216 of each projection of the plurality of projections 208 thereby securing the second end 204b of the body 204 to the bar, or other structure, of the vehicle 104. Lastly, the bracket 212 is releasably attached to a first extension arm coupling mechanism 230 such that the bar 224 is received by the first extension arm coupling mechanism 230. The coupling mechanism 230 is secured to an interior surface 204 of the panel 202. In other examples, however, the first panel extension arm 192 can be placed in the engaged position by first releasably attaching the bracket 212 to the first extension arm coupling mechanism 230 and then placing the second end 204b of the body 204 into contact with the bar, or other structure, of the vehicle.

FIGS. 11 and 12 illustrate an example of another panel extension arm assembly 200 that is constructed in accordance with the teachings of the present disclosure. The second panel extension arm assembly 200 has a body 240, a coupling structure 244, and an arm 248. The body 240 couples the coupling structure 244 and the coupling arm 248 to a portion of the vehicle 104 (e.g., an interior portion of a panel 202) via a plurality of fasteners. The coupling structure 244 is coupled to and extends outwardly from the body 240 of the second panel extension arm 200. As illustrated in FIG. 12, the coupling structure 244 includes a securement aperture 252 that retains the coupling arm 248 in disengaged position via a pin 256, as shown in FIG. 11.

The arm 248 is an elongate body that has a first end 248a, a second end 248b that is opposite the first end 248a, and a plurality of apertures 260. The coupling arm 248 is pivotably coupled to the coupling structure 244 at a pivot point 264 at the first end 248a and is releasably coupled to the securement aperture 248 of the coupling structure 244. The coupling arm 248 is retained in the disengaged position (FIG. 11) via a pin 256 that extends through both the coupling arm 248 and the securement aperture 252. To place the coupling arm 248 in the engaged position, the pin 256 is removed from both a second aperture 206b (FIG. 12) of the coupling arm 248 and the securement aperture 252, and the coupling arm 248 pivots about the pivot point 264 until a first aperture 260a of the coupling arm 248 is concentric with an aperture on the body 108 of the vehicle 104. A bar 268 may be placed through the first aperture 260a once the first aperture 260a of the plurality of apertures 260 aligns with the aperture on the body 108 of the vehicle 104, as shown in FIG. 12. So configured, the coupling arm 248 is in the engaged position and will hold the portion of the vehicle 104 (e.g., the body 108, a panel 202) in an extended position such that the portion of the vehicle 104 is disposed away from the body 108 of the vehicle 104.

The disclosed scraper 100 may be attached to a vehicle (e.g., a combine) and remove debris disposed in the gap 114 between the first and second tires 112a, 112b as the vehicle 104 drives or otherwise travels over unpaved terrain. The scraper 100 is attached to the vehicle 104 at two different points to absorb the impact of debris against the paddle 132 as the paddle 132 comes into contact and removes debris from the gap 114 between the first and second tires 112a, 112b. In particular, the tower 120 is coupled to the axle 116 of the vehicle as a first point of contact, and the bracing arm 124 is coupled to the body 108 (e.g., the chassis, the frame) of the vehicle 104 as a second point of contact and, the support arm 148 is a third point of contact with of the vehicle 104.

The extension arm 128 is configured and oriented relative to the tower 120 such that the extension arm 128 extends downwardly from a point on the tower 120 that is above the height of the first and second tires 112a, 112b toward the first and second tires 112a, 112b. Doing so reduces, if not eliminates, the number of surfaces on which debris can build-up, which keeps the scraper 100 clean thereby maintaining the efficacy of the scraper 100. The paddle 132 can be positioned on the extension arm 128 such that the blade 176 of the paddle 128 is disposed above the center of the first and second tires 112a, 112b because the extension arm 128 extends downward from the tower 120 toward the first and second tires 112a, 112b. So configured, as the vehicle moves forward (i.e., the first and second tires 112a, 112b rotate clockwise), the debris built-up in the gap 114 between the first and second tires 112a, 112b is brought into contact with the blade 176 of the paddle 132. Advantageously, this allows the gap 114 to be cleaned continuously as a user continues operating the vehicle 104.

The disclosed scraper 100 may include a number of additional benefits other than those discussed above. In particular, the components of the scraper 100 may be adjusted in size, shape, orientation, and attachment angle to pair with a variety of different types of vehicles. The point of connection for each of the parts of the scraper 100 can also be adjusted to compensate for variations in vehicle layout depending on the particular make and model of the vehicle 104. A user of the scraper 100 may also purchase several different types of parts that have various shapes, sizes, and configurations. Advantageously, if a user owns several vehicles, and possibly several different types of vehicles, the user may move the scraper 100 between the vehicles by changing the necessary components before securing the scraper 100 to the other vehicle. Such a feature allows the scraper 100 to have a unique fit for different makes and models of vehicles 104.

Further, the disclosed scraper 100 is designed to attach to existing appendages, features, brackets, apertures of the vehicle such that the vehicle itself does not need to be modified when mounting the scraper 100. However, the vehicle can be outfitted with various brackets, holes, etc. to accommodate the different components of the scraper 100. As such, the locations of the support arm and bracing arm may be different relative to the tower to accommodate various locations of these features.

The disclosed scraper 100 may also advantageously lower the amount of time spent cleaning the gap 114 between the first and second tires 112a, 112b. In particular, because the scraper 100 limits the number of surfaces available for debris to build up on and continuously cleans the gap 114 between the first and second tires 112a, 112b, less debris may be disposed in the gap 114 and on the scraper 100 itself. Accordingly, cleaning and maintenance of a vehicle's dual-tire configuration may significantly decrease when compared to manually cleaning the gap 114, the first and second tires 112a, 112b, and the scraper 100. This process of manually cleaning the gap 114 between the first and second tires 112a, 112b typically occurred between rounds of running the combine in the field, which would waste daylight—a valuable commodity to farmers. Similarly, continuous removal of the debris between the gap 114 by the scraper 100 as the vehicle 104 is in use, may also mitigate the vehicle 104 from becoming stuck due to a build-up of debris reducing traction and/or weighing down the vehicle.

The scraper 100 is also designed to facilitate assembly to a vehicle. The components of the scraper 100 are strong, lightweight, easy to ship, receive, and handle. Because of the intuitive nature of assembling the scraper, one or two people can efficiently attach each component to the vehicle to mount the scraper, as discussed above.

Preferred embodiments of this invention are described herein, including the best mode or modes known to the inventors for carrying out the invention. Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments. Further, it also should be understood that the illustrated embodiments are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

The invention claimed is:

1. A vehicle comprising:
   a body having a front end, a rear end opposite the front end, and a longitudinal axis extending between the front and rear ends;
   an axle coupled to the body and perpendicular relative to the longitudinal axis;
   a first tire, a second tire, and a gap between the first and second tires, the first and second tires coupled to the axle;
   a scraper coupled to the body and configured to remove debris from between the first and second tires, the scraper including:
   a tower having a first end coupled to the axle and a second end disposed at a height greater than a height of the first and second tires;
   an extension arm coupled to the tower and extending outward relative to the longitudinal axis of the body; and
   a paddle coupled to the extension arm and including a first end at least partially disposed in the gap between the first and second tires and a second end coupled to the extension arm.

2. The vehicle of claim 1, wherein the tower extends away from the axle and toward a rear of the vehicle.

3. The vehicle of claim 1, wherein the scraper further comprises a bracing arm having a first end coupled to the tower and a second end coupled to the body, the bracing arm arranged to limit rotation of the tower relative to the axle.

4. The vehicle of claim 3, wherein the bracing arm is coupled to the tower between the first end of the tower and the extension arm.

5. The vehicle of claim 3, further comprising a support arm coupled to the tower and to the body of the vehicle, the support arm arranged to minimize inward and outward movement of the tower relative to the longitudinal axis of the vehicle.

6. The vehicle of claim 1, wherein the extension arm includes an end disposed below the height of the first and second tires.

7. The vehicle of claim 6, wherein the paddle is adjustably connected to the end of the extension arm so that a distance between the paddle and the tower is adjustable.

8. The vehicle of claim 1, wherein the first end of the paddle includes a blade sized to fit within the gap and spaced from the first and second tires.

9. The vehicle of claim 1, wherein an angle between a longitudinal axis of the tower and a longitudinal axis of the extension arm is in a range of approximately 10 degrees and approximately 90 degrees.

10. The vehicle of claim 1, further comprising a tower coupling mechanism having a first plate and a second plate attached to opposite sides of the axle.

11. The vehicle of claim 1, wherein an angle between a longitudinal axis of the tower and the longitudinal axis of the vehicle is in a range of approximately 10 degrees and approximately 90 degrees.

12. A scraper for removing debris from a vehicle, the scraper comprising:
   a tower having a first end, a second end opposite the first end, and a longitudinal axis extending between the first and second ends, the first end configured to couple to a first portion of the vehicle;
   a bracing arm having a first end, a second end, and a longitudinal axis extending between the first and second ends of the bracing arm, the first end coupled to the tower and the second end configured to couple to a second portion of the vehicle that is different from the first portion of the vehicle; and
   a paddle suspended by the tower and configured to extend to a location adjacent a tire of the vehicle;
   wherein an angle between the longitudinal axis of the bracing arm and the longitudinal axis of the tower is in a range of approximately 10 degrees to approximately 90 degrees.

13. The scraper of claim 12, wherein the bracing arm is coupled to the tower between the second end of the tower and a midpoint of the tower to counteract a torque exerted on the tower by the paddle.

14. The scraper of claim 12, wherein the paddle includes a blade disposed at a first end and a paddle coupling mechanism disposed at a second end of the paddle, the paddle coupling mechanism adjustably coupling the paddle to the extension arm.

15. The scraper of claim 12, wherein the first end of the bracing arm is disposed between the first and second ends of the tower.

16. The scraper of claim 12, further comprising an extension arm coupled to the second end of the tower, the paddle coupled to an end of the extension arm, wherein an angle between the extension arm and the tower is in a range of approximately 10 degrees and approximately 90 degrees.

17. The scraper of claim 16, wherein the first end of the bracing arm is coupled to the tower between the extension arm and the first end of the tower.

18. The scraper of claim 16, wherein an angle between the paddle and the extension arm is in a range of approximately 90 degrees and approximately 130 degrees.

19. The scraper of claim 12, further comprising a support arm coupled to the tower at a location between the first end of the bracing arm and the second end of the tower, the support arm extending perpendicular relative to the longitudinal axis of the tower and arranged to couple to a different portion of the vehicle.

20. The scraper of claim 12, wherein the bracing arm includes a bracing coupling plate extending perpendicular relative to the longitudinal axis of the tower.

* * * * *